United States Patent
Fasen

(10) Patent No.: US 11,300,899 B2
(45) Date of Patent: Apr. 12, 2022

(54) PRINT SUBSTANCE OUTPUT ADJUSTMENTS

(71) Applicant: HEWLETT-PACKARD DEVELOPMENT COMPANY, L.P., Spring, TX (US)

(72) Inventor: Donald J. Fasen, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,187

(22) PCT Filed: Jul. 17, 2018

(86) PCT No.: PCT/US2018/042437
§ 371 (c)(1),
(2) Date: Oct. 10, 2019

(87) PCT Pub. No.: WO2020/018076
PCT Pub. Date: Jan. 23, 2020

(65) Prior Publication Data
US 2021/0325798 A1    Oct. 21, 2021

(51) Int. Cl.
| | |
|---|---|
| *G03G 15/08* | (2006.01) |
| *B41F 31/02* | (2006.01) |
| *B41J 2/175* | (2006.01) |
| *G06K 15/02* | (2006.01) |
| *G06K 15/00* | (2006.01) |

(52) U.S. Cl.
CPC ......... *G03G 15/0849* (2013.01); *B41F 31/02* (2013.01); *B41J 2/17503* (2013.01); *G06K 15/027* (2013.01); *G06K 15/4075* (2013.01)

(58) Field of Classification Search
USPC .......................................... 399/62
See application file for complete search history.

(56) References Cited

U.S. PATENT DOCUMENTS

| | | | |
|---|---|---|---|
| 5,546,170 | A | 8/1996 | Ohba et al. |
| 5,825,377 | A | 10/1998 | Gotoh et al. |
| 6,266,153 | B1 | 7/2001 | Davidson et al. |
| 7,398,029 | B2 | 7/2008 | Jacobsen et al. |
| 7,602,510 | B2 | 10/2009 | Rambola et al. |
| 7,835,035 | B2 | 11/2010 | Patton et al. |
| 9,256,152 | B2 | 2/2016 | Jinno et al. |
| 9,477,174 | B1 | 10/2016 | Hill et al. |

(Continued)

FOREIGN PATENT DOCUMENTS

| | | |
|---|---|---|
| CN | 1251871 | 4/2006 |
| CN | 1260068 | 6/2006 |

(Continued)

*Primary Examiner* — Quana Grainger
(74) *Attorney, Agent, or Firm* — HP Inc. Patent Department

(57) ABSTRACT

In an example, a printing device may include a cartridge including a print substance, a belt, and a controller including a processing resource and a memory resource. The processing resource may execute instructions to deposit a plurality of patches of the print substance from the cartridge onto the belt to determine a cartridge density based on a density of a sub-set of patches of the plurality of patches; and adjust a print substance output of the cartridge based on the determined density of the print substance in the cartridge.

12 Claims, 5 Drawing Sheets

(56) References Cited

U.S. PATENT DOCUMENTS

| | | | |
|---|---|---|---|
| 9,542,130 B2 | 1/2017 | Subbaian et al. | |
| 2002/0126301 A1* | 9/2002 | Bowers | B41J 2/17546 358/1.9 |
| 2004/0001209 A1* | 1/2004 | Chu | H04N 1/6033 358/1.9 |
| 2004/0096231 A1 | 5/2004 | Furno et al. | |
| 2005/0073731 A1* | 4/2005 | Deer | H04N 1/6033 358/518 |
| 2010/0247114 A1 | 9/2010 | Cornell et al. | |
| 2011/0158667 A1 | 6/2011 | Ishii | |
| 2013/0222461 A1 | 8/2013 | Kaszynski | |

FOREIGN PATENT DOCUMENTS

| | | |
|---|---|---|
| CN | 101221487 | 7/2008 |
| CN | 101298210 | 11/2008 |
| CN | 103842911 | 6/2014 |
| EP | 0599261 A1 | 6/1994 |
| EP | 1043164 A2 | 10/2000 |
| EP | 1389528 A1 | 2/2004 |
| EP | 1527876 A1 | 5/2005 |
| JP | 2010284909 | 12/2010 |
| KR | 10-2005-0004505 A | 1/2005 |

\* cited by examiner

PRINT SUBSTANCE OUTPUT ADJUSTMENTS

BACKGROUND

Imaging systems, such as printing devices, printers, copiers, etc., may be used to form markings on a print medium, text; images, etc. In some examples, imaging systems may form markings on the print medium by performing a print job. A print job can include forming markings such as text and/or images by transferring a print substance (e.g., ink, toner, etc.) from a cartridge to the print media. A density of the print substance may affect the appearance of the markings deposited on the print media.

DETAILED DESCRIPTION

Figure 1:
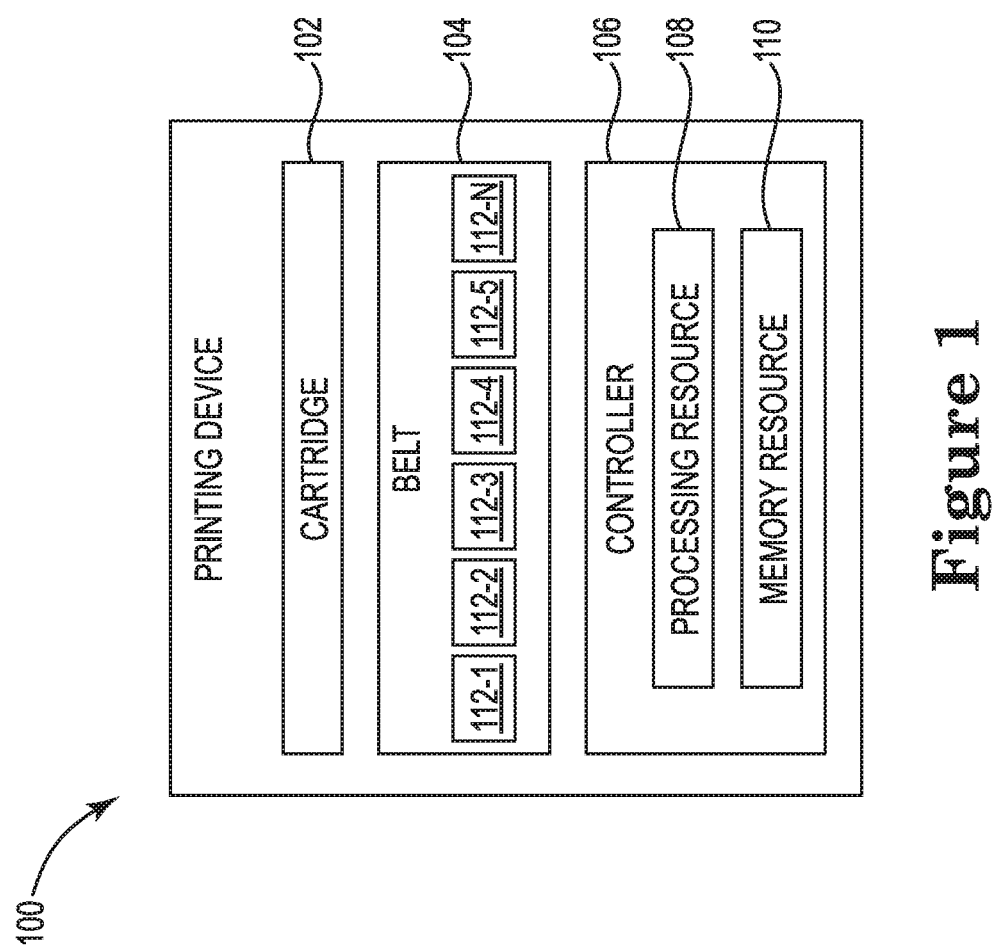
FIG. 1 illustrates an example printing device including a cartridge and a belt consistent with the disclosure.

Printing devices may form markings on a physical print medium (e.g.; paper, photopolymers, plastics, composite, metal, wood, etc.) by transferring a print substance (e.g., ink, toner, etc.) to the physical medium. As used herein, the term "printing device" refers to a hardware device with functionalities to physically produce representation(s) of text, images, models, etc. on a physical print medium. Examples of imaging devices may include imaging devices such as ink/toner printers and/or three-dimensional printers, among other types of imaging devices.

Printing devices may store print substance within a cartridge to deposit the print substance onto print media during the output of a print job. As used herein, the term "cartridge" refers to a container to store print substance within a printing device. As used herein, the term "print job" refers to a printing device forming markings (text, images, and/or objects) on print media (e.g., the print job output). For example, a print job may include depositing an amount of print substance from the cartridge onto print media to be used in forming text, images, and/or objects on print media. The appearance of the markings of the print substance on the print media may be a factor in determining if the output of a print job is satisfactory.

In some examples, markings of print substance that are light may make the markings difficult to view, which may affect the text, images, and/or objects on the print media. This may result in a repeat of print job output, therefore wasting time and resources. In other examples, markings of print substance that are dark may be easily interpreted, and therefore satisfactory. However, the markings may be utilizing more print substance than demanded for a satisfactory output of a print job. In other words, dark markings on print media may be an indication that print substance is being wasted, and the amount of print substance deposited on the print media may be decreased while still maintaining a satisfactory print job output. The density of print substance deposited from a cartridge may determine how light or dark the markings appear on the print media.

When a cartridge deposits print substance with a high density, the markings may appear darker. Print substance savings may be applied to the cartridge to decrease an amount of print substance output to conserve resources while maintaining a satisfactory print job output. As used herein, the term "print substance savings" refers to an amount of print substance that may be withheld from being deposited onto print media during the output of a print job to still maintain a satisfactory print job output.

In some examples, an inappropriate application of print substance savings may not result in a conservation of resources. For example, when a cartridge deposits print substance with a low density, the markings may appear lighter, and applying print substance savings would decrease the print substance output. This may result in markings that are so light that they would not output a satisfactory print job output, thus wasting resources by repeating print jobs to obtain a satisfactory result.

The cartridges that store the print substance in the imaging device may have characteristics (e.g., factors) that may cause print substance to be deposited onto print media at differing densities. Factors such as manufacturing differences of the cartridges, the charge characteristics of the print substance contained in the cartridges, the dimensional tolerances of the cartridges, environmental conditions (e.g., humidity) and/or an amount of print substance within a cartridge may result in cartridges depositing the print substance included therein at differing densities based on the aforementioned factors. As an example, the density of print substance within a cartridge may vary between manufactures. In other examples, the charge characteristics may vary throughout the lifespan of the cartridge, which can cause a cartridge to deposit print substance at a particular density (e.g., a cartridge density) when the cartridge is new, and a different density when the cartridge has been in use (e.g., midway and/or toward the end of its lifespan).

Print substance output adjustments can allow for determining a cartridge density by determining the density of print substance deposited from the cartridge, and based on the determined cartridge density, altering or refraining from altering an amount of print substance deposited on print media. As used herein, the term "cartridge density" refers to a density of print substance deposited by a cartridge. As described above, cartridge density may be different between different cartridges based on the aforementioned factors and/or within a particular cartridge as it is utilized for multiple print job outputs. For example, a cartridge may be determined to have a particular density when it is new, but after multiple print jobs, a different cartridge density when it has been used for the multiple print job outputs.

The printing device may include a stored predetermined range of density values, where the range of cartridge density values correspond to an amount of print substance to deposit on the print media. The determined cartridge density may be compared to the stored range of cartridge density values, and the comparison may include instructions of whether to apply print substance savings or refrain from applying print substance savings based on the comparison. Thus, based on the determined cartridge density, a printing device may be instructed to decrease, increase, and/or refrain from altering the amount of print substance deposited onto a piece of print media, thereby preserving resources, saving time, and money.

FIG. 1 illustrates an example printing device 100 including a cartridge 102 and a belt 104 consistent with the disclosure. Cartridge 102 can deposit a plurality of patches 112-1, . . . , 112-N onto the belt 104. As used herein, the plurality of patches 112-1, . . . , 112-N may be collectively referred to as the plurality of patches 112. The printing device 100 further includes a controller 106 which includes a processing resource 108, a memory resource 110 including a non-transitory machine-readable instructions executable by the processing resource 108.

As used herein, the term "controller" refers to a computing device that may contain a processing resource and a memory resource to execute instructions. The controller 106 may be included in the printing device 100, a standalone device, or in a separate device that may be located external to the printing device 100. The controller 106 may determine information relating to the print job and execute instructions based on that information. For example, the information relating to the print job may refer to multiple individual pieces of print media (e.g., the output of a print job), a size of the piece of print media, the cartridge, the cartridge density, whether print substance savings have been programmed to conserve resources, and the number of print jobs that have been applied to a cartridge, etc.

FIG. 1 illustrates an example processing resource 108, and an example memory resource 110 of an example printing device 100. For example, the controller 106 may include a processing resource 108 which may be a central processing unit (CPU), a semiconductor-based microprocessor, and/or other hardware devices suitable for retrieval and execution of instructions stored in a memory resource (e.g., in a non-transitory computer readable medium) 110. The example processing resource 108 may fetch, decode, and execute instructions. As an alternative, or in addition to, retrieving and executing instructions, the example processing resource 108 may include an electronic circuit that may include electronic components for performing the functionality of executed instructions.

In some examples, the processing resource 108 may be a plurality of hardware processing units that may cause machine-readable instructions to be executed. The processing resource 108 may include central processing units (CPUs) among other types of processing units. The memory resource 110 may be any type of volatile or non-volatile memory or storage, such as random-access memory (RAM), flash memory, storage volumes, a hard disk, or a combination thereof. The controller 106 may execute instructions using the processing resource 108 based on information relating to the print job.

The controller 106 may instruct the cartridge 102 to deposit the print substance contained therein onto the belt 104 to determine the cartridge density. For example, the controller 106 may instruct the cartridge 102 to deposit a plurality of patches 112 of the print substance from the cartridge 102 onto the belt 104 to determine the cartridge density of the cartridge 102. As used herein, the term "patch" refers to an amount of print substance deposited onto an area of a belt 104 of a printing device 100. Measurements of a deposited patch may be made by the printing device 100 to determine density characteristics of the print substance, as is further described herein. As used herein, the term "belt" refers to a component of the printing device 100 that may receive the plurality of patches from cartridge 102. For example, the cartridge 102 may deposit the plurality of patches 112 of print substance onto the belt 104, and the printing device 100 may utilize sensors to measure a density of each patch, determine the cartridge density, and to decide whether to apply print substance savings, as is further described herein.

Although not shown in FIG. 1 for clarity and so as not to obscure examples of the disclosure, the density of the plurality of patches 112 may be measured by existing sensors within the printing device 100. As used herein, the term "sensor" refers to a component of the printing device 100 that may take measurements of characteristics of the print substance and/or other metrics related to the printing device 100. For example, the sensor may be an optical sensor, a densitometer, a spectrometer, a weight sensor, etc.

The measurements of the plurality of patches 112 by the sensor may determine a density of the print substance corresponding to each patch of the plurality of patches 112 and provide a density value for each patch of the plurality of patches 112. The determined density values of the plurality of patches 112 may be collected by the controller 106. Based on the collected density values of each of the plurality of patches 112, the controller may select a sub-set of the plurality of patches 112 which may be used to determine the cartridge density. The selection of the sub-set of patches are discussed in further detail in conjunction with FIG. 2.

For example, the controller 106 may instruct the cartridge 102 to determine a cartridge density based on a density of a sub-set of patches of the plurality of patches. The sub-set of patches may be a group of patches of the plurality of patches 112 that were determined to have the highest density values when compared to the density values of the plurality of patches 112. For example, patches 112-3, 112-5, and 112-6 may be a sub-set of patches of the plurality of patches 112 with the highest density values of the plurality of patches 112. The controller 106 may perform calculations on the density values obtained from the sub-set of the plurality of patches 112 to determine the cartridge density, as is further described in connection with FIG. 2.

For example, the controller 106 may adjust a print substance output of the cartridge 102 based on the determined cartridge density of the cartridge 102. The controller 106 may apply print substance savings or refrain from applying print substance savings based on a comparison of the determined cartridge density to a predetermined range of density values. The controller 106 may determine that a cartridge 102 has a particular cartridge density based on the density values of a sub-set of the plurality of patches 112. For example, the cartridge density is an average density of the sub-set of patches, as is further described in connection with Figure.

The controller 106 may compare the determined cartridge density of the cartridge 102 to a predetermined range of density values that may be stored in the memory resource 110 of the printing device 100. Each value of the predetermined range of density values may include actions to be performed to cause varying amounts of print substance savings to be applied to a cartridge 102.

For example, each value of the predetermined range of density values may correspond to a level of satisfactory or unsatisfactory result when print substance savings are applied to a cartridge 102 having a particular density. As used herein, the term "predetermined range of density values" refers to a value that may be an actual measurement and/or be derived from a density value of print substance deposited on a patch and/or a sub-set of the plurality of patches 112. As mentioned above, the controller 106 may determine the cartridge density based on the density values of the sub-set of the plurality of patches 112, In some examples, the controller 106 may compare the cartridge density to an example of predetermined range of density values stored by the controller 106 and shown in Table 1 below,

TABLE 1

| Predetermined Range of Density Values | Apply Print Substance Savings: Yes/No |
|---|---|
| 1.0 | No |
| 1.2 | No |
| 1.4 | Yes |
| 1.6 | Yes |
| 1.8 | Yes |
| 2.0 | Yes |

In some examples, the predetermined range of density values may be determined in response to a sensor detecting density values that correspond to markings created by the print substance on print media that are light and/or dark. In some examples, a density value derived from a sub-set of the plurality of patches 112 may correspond to a predetermined range of density values indicating that the markings are light, and the application of print substance savings may be inappropriate because they may result in an unsatisfactory print job output. In this instance, the predetermined range of density values of Table 1 may indicate to refrain from applying print substance savings.

In some examples, a density value derived from a sub-set of the plurality of patches 112 may correspond to a predetermined range of density values indicating that the markings are dark, and the application of print substance savings would result in a satisfactory print job output, thus print substance savings may be applied to conserve resources. In this instance, the predetermined range of density values of Table 1 may indicate to apply print substance savings. In some examples, the predetermined range of density values may be arbitrary numbers assigned to particular density values and determined by the controller 106.

The controller 106 may determine the predetermined density thresholds corresponding to the predetermined range of density values illustrated in Table 1 above. As used herein, the term "predetermined density threshold" refers to a value which corresponds to a satisfactory or unsatisfactory output of a print job. For example, the controller 106 may determine that a cartridge 102 has a determined density of 1.2 based on the measured density of the plurality of patches 112.

The controller 106 may compare the cartridge density 1.2 to the predetermined range of density values (e.g., Table 1) and determine that 1.2 corresponds to "No" print substance savings. Based on the 1.2 density value, the controller 106 may refrain from adjusting the print substance output in response to the determined cartridge density being below a predetermined density threshold. In such an example, the predetermined threshold is at or below 1.2. Since the predetermined range of density values of 1.2 corresponds to markings deposited by the print substance of the cartridge 102 being light, reducing the amount of print substance deposited on print media during the output of a print job would result in an unsatisfactory print job output. In other words, effort, time, money, and resources may be wasted if print substance savings were to be applied in this example.

In another example, the controller 106 may determine that a cartridge 102 has a determined density of 1.8 based on the measured density of the plurality of patches 112. The controller 106 may compare the cartridge density of 1.8 to the predetermined range of density values (e.g., in Table 1) and determine that 1.8 corresponds to "Yes" print substance savings. Based on the 1.8 density value, the controller 106 may decrease the print substance output in response to the determined cartridge density being above a predetermined density threshold. In such an example, the predetermined threshold is above 1.2. Since the predetermined range of density values of 1.8 corresponds to markings by the print substance of the cartridge 102 being dark, reducing the amount of print substance deposited on print media during the output of a print job would result in a satisfactory print job output. Thus, print substance may be conserved as a result of print substance savings. In this way, effort, time, money, and resources may be saved when print substance savings are applied.

In some examples, predetermined threshold values may correspond to a level to which print substance savings may be applied to a cartridge. In contrast to applying print substance savings or refraining from applying print substance savings, the printing device 100 may apply print substance savings a moderate amount. In other words, a moderate amount may be more print substance savings than not applying them at all, but less than the maximum amount of print substance savings. For example, the controller 106 may compare the cartridge density to predetermined range of density values stored by the controller 106 summarized by Table 2 below.

TABLE 2

| Predetermined Range of Density Values | Level of Print Substance Savings: None/Medium/Full |
|---|---|
| 1.0 | None |
| 1.2 | None |
| 1.4 | Medium |
| 1.6 | Medium |
| 1.8 | Full |
| 2.0 | Full |

For example, the controller 106 may determine that a cartridge 102 has a determined density of 1.8 based on the measured density of the plurality of patches 112. The controller 106 may compare the cartridge density 1.8 to the predetermined range of density values in (e.g., Table 2) and determine that 1.8 corresponds to "Full" print substance savings. In response to that determination, the controller 106 may apply the maximum amount of print substance savings. The cartridge density of 1.8 indicates that the marking from that the cartridge 102 are dark and may sustain a maximum amount of print substance savings while producing a satisfactory print job output. Thus, the print substance may be conserved through the application of print substance savings, and more print job output may be obtained from an individual cartridge. In this way, effort, time, money, and resources may be saved when print substance savings are applied.

In another example, the controller 106 may determine that a cartridge 102 has a determined density of 1.6 based on the measured density of the plurality of patches 112. The controller 106 may compare the cartridge density 1.6 to the predetermined range of density values in (e.g., Table 2) and determine that 1.6 corresponds to "Medium" print substance savings. In response, the controller 106 may apply a medium amount of print substance savings. The cartridge density of 1.6 indicates that the marking from that the cartridge 102 are dark and may sustain some amount of print substance savings, but not a maximum amount of print substance savings, while producing a satisfactory print job output. In this way, effort, time, money, and resources may be saved when print substance savings are applied.

Print substance output adjustments according to the disclosure may determine a cartridge density of a cartridge 102 based on a density of the print substance included in the cartridge 102. The cartridge density can be determined by sensors measuring a density of a plurality of patches 112. In this way, the cartridge density can be determined and compared to a predetermined range of density values to determine if print substance savings may be applied to the cartridge 102 to conserve resources while producing a satisfactory print job output.

Figure 2:
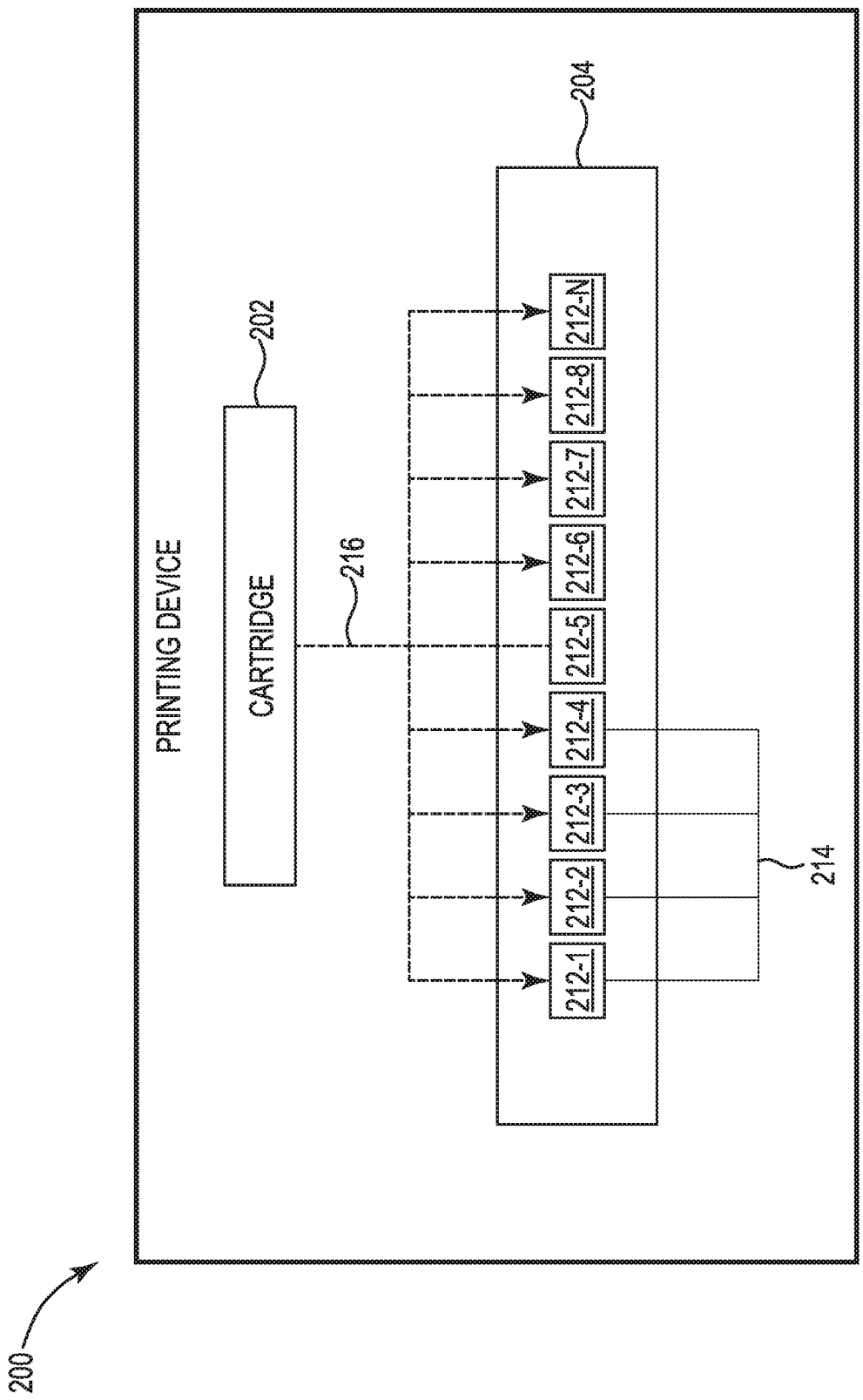
FIG. 2 illustrates an example printing device including a cartridge and a belt consistent with the disclosure.

FIG. 2 illustrates an example printing device 200 including a cartridge 202 and a belt 204 consistent with the disclosure. Printing device 200 can include a cartridge 202 to deposit print substance 216 onto a belt 204 to generate a plurality of patches 212-1, . . . , 212-N. As used herein, the plurality of patches 212-1, . . . , 212-N may be collectively referred to as the plurality of patches 212.

FIG. 2 illustrates a sub-set of patches 214. In the example illustrated in FIG. 2, the patches 212-1, 212-2, 212-3, and 212-4 of the plurality of patches 212 collectively make up the sub-set of patches 214.

Although the sub-set of patches 214 are illustrated in FIG. 2 as including four patches, examples of the disclosure are not so limited. For example, the sub-set of patches 214 may include more or less than four patches, and examples are not limited to the patches 212-1, 212-2, 212-3, and 212-4 of the plurality of patches 212.

Although not shown in FIG. 2 for clarity and so as not to obscure examples of the disclosure, the printing device 200 may include a controller (e.g., the controller 106 of FIG. 1) which includes a processing resource (e.g., the processing resource 108 of FIG. 1), and a memory resource (e.g., the memory resource 110 of FIG. 1) including a non-transitory machine-readable instructions executable by the processing resource. In some examples, a sensor(s) (not shown) included in printing device 200 may measure the density of each of the plurality of patches 212 to determine a cartridge density of the cartridge 202.

As described in connection with FIG. 1, the cartridge 202 may have different cartridge densities during its lifespan. As used herein, the term "lifespan" refers to an amount of time in which the cartridge 202 is used to provide markings on print media. For instance, the cartridge density of cartridge 202 may change based on an amount of print media output that the cartridge has produced. In some examples, the cartridge density of cartridge 202 may change based on manufacturing differences and based on an amount of print media output that the cartridge has produced.

The cartridge density may be determined at several points during the lifespan of the cartridge 202. For example, a cartridge 202 may be manufactured to provide 10,000 pieces of print media as outputs of print jobs. However, when print substance savings are applied the lifespan of the cartridge 202 may be extended to 15,000 pieces of print media.

The cartridge density may be determined at predetermined intervals during the lifespan of the cartridge 202. In some examples, determining the cartridge density may be performed at a predetermined interval based on an amount of print media output from the printing device. For example, the cartridge density may be determined every 1000 pieces of print media are utilized in an output of a print job. In other examples, the predetermined intervals may be based on an amount of time.

As previously described in connection with FIG. 1 the controller of the printing device 200 can determine a cartridge density at a given instance by instructing the cartridge 202 to deposit the print substance 216 onto a belt 204 to create a plurality of patches 212. A sensor (not illustrated by FIG. 2) may measure the density of each patch of the plurality of patches 212, and the sub-set of patches 214 of the plurality of patches may be selected to determine the cartridge density based on the determined density of the sub-set of patches 214 being above a predetermined density threshold. For example, each patch of the plurality of patches 212 may have a measured density such as those listed above in Table 1.

The predetermined threshold in the preceding example may be a density at which print substance savings may be applied (e.g., above 1.2 according to Table 1, as previously described in connection with FIG. 1). The density of each patch of the plurality of patches 212 may be compared to the predetermined range of density values, and the sub-set of patches 214 may be selected to determine the cartridge density because each patch 212-1, 212-2, 212-3, and 212-4 may be measured to have the highest densities. The controller of the printing device 200 may perform a calculation on the determined densities of the sub-set of patches 214 to determine the cartridge density.

For example, the cartridge density of the cartridge 202 may be determined by calculating an average density of the sub-set of patches 214 of the plurality of patches 212. For example, the densities for patches 212-1, 212-2, 212-3, and 212-4 can be 1.4, 1.6, 1.6, and 1.8, respectively. The cartridge density may be determined by calculating an average of the densities for patches 212-1, 212-2, 212-3, and 212-4. Accordingly, the cartridge density of the cartridge 202 may be determined to be 1.6. In this example, the cartridge density of 1.6 may be compared to the predetermined range of density values (e.g., of Table 1) because the comparison to the Table 1 (or Table 2) may instruct the controller to apply print savings. Print substance savings may be applied to conserve resources by allowing the cartridge to utilize less print substance deposited on print media.

As another example, the cartridge density of the cartridge 202 may be determined by calculating an average density of the sub-set of patches 214 of the plurality of patches 212. For example, the densities for patches 212-1, 212-2, 212-3, and 212-4 can be 1.0, 1.2, 1.2, and 1.4, respectively. The cartridge density may be determined by calculating an average of the densities for patches 212-1, 212-2, 212-3, and 212-4. Accordingly, the cartridge density of the cartridge 202 may be determined to be 1.2. In this example, the cartridge density of 1.2 may be compared to the predetermined range of density values (e.g., of Table 1) and print substance savings may not be applied. The cartridge density of 1.2 indicates that the print substance is light enough that applying print savings may result in the print substance deposited on the print media being unsatisfactory. Thus, if print substance savings are applied, print jobs may be repeated to obtain a satisfactory print job output, thus wasting resources.

Figure 3:
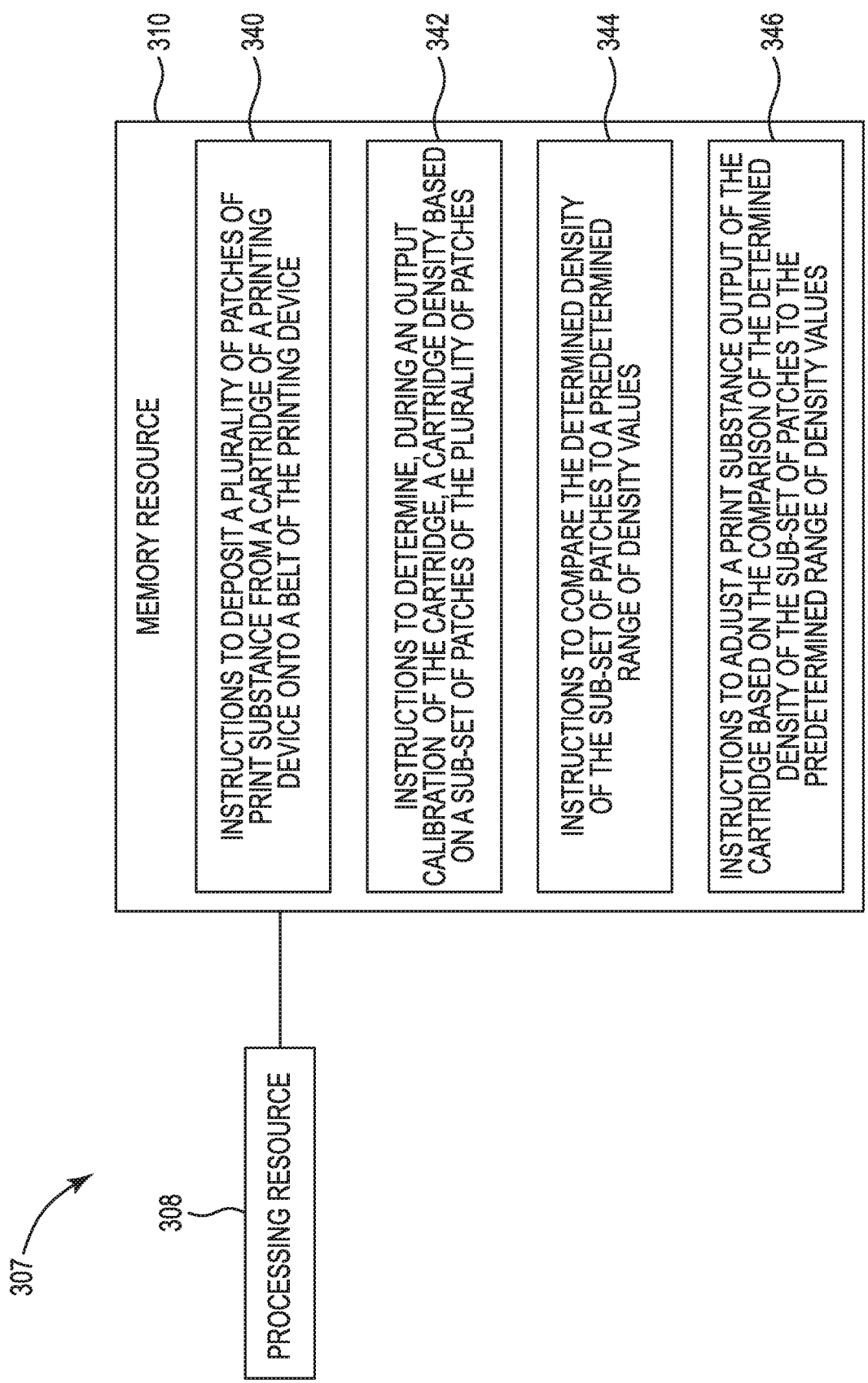
FIG. 3 illustrates an example system for print substance output adjustments consistent with the disclosure.

FIG. 3 illustrates an example system for print substance output adjustments consistent with the disclosure. Although not shown in FIG. 3 for clarity and so as not to obscure examples of the disclosure, the system 307 may include a controller (e.g., the controller 106 of FIG. 1). For example, the controller may include a processing resource 308 which may be a central processing unit (CPU), a semiconductor-based microprocessor, and/or other hardware devices suitable for retrieval and execution of instructions stored in a memory resource (e.g., in a non-transitory computer readable medium) 310. The example processing resource 308 may fetch, decode, and execute instructions. As an alternative, or in addition to, retrieving and executing instructions, the example processor may include an electronic circuit that may include electronic components for performing the functionality of executed instructions.

In some examples, the processing resource 308 may be a plurality of hardware processing units that may cause machine-readable instructions to be executed. The processing resource 308 may include central processing units (CPUs) among other types of processing units. The memory resource 310 may be any type of volatile or non-volatile memory or storage, such as random-access memory (RAM), flash memory, storage volumes, a hard disk, or a combination thereof.

The memory resource 310 may store instructions thereon, such as instructions 340, 342, 344, and 346. When executed by the processing resource 308, the instructions may cause the controller to perform specific tasks and/or functions. For example, the memory resource 310 may store instructions 340 which may be executed by the processing resource 308 to cause the controller 306 to deposit a plurality of patches (e.g., the plurality of patches 212) of print substance from a cartridge (e.g., the cartridge 202) of the printing device onto a belt (e.g., the belt 204) of the printing device. For example, the cartridge may deposit an amount of the print substance contained therein to the belt in multiple patches such that a density of each patch of the print substance deposited on the belt may be determined. The cartridge density may be determined based on an average density of a sub-set of patches (e.g., the sub-set 214) of the plurality of patches.

The memory resource 310 may store instructions 342 which may be executed by the processing resource 308 to cause the controller 306 to determine, during an output calibration of the cartridge, a cartridge density based on a sub-set of patches of the plurality of patches. As used herein, the term "output calibration" refers to an instance where the printing device is determining a cartridge density to identify if print substance saving may be applied to a cartridge. For example, when a new cartridge is installed in the printing device, and/or when the manufacturer of the cartridge has changed, an output calibration may be executed. A sensor (not illustrated in FIG. 3) may measure the density of each patch of the plurality of patches, and a sub-set of patches of the plurality of patches may be selected to determine the cartridge density based on the determined density of the sub-set of patches. For example, each patch of the plurality of patches 212 may have a measured density such as those listed above in Table 1 and/or Table 2 above. The determined average density of the sub-set of patches 214 of the plurality of patches 212 may be compared to the Table 1 and/or Table 2 to determine if print substance savings may be applied to the cartridge.

The memory resource 310 may store instructions 344 which may be executed by the processing resource 308 to cause the controller 306 to compare the determined density of the sub-set of patches to a predetermined range of density values such as those listed in Table 1 above. For example, if the determined density of the sub-set of patches is 1.4, the controller may compare the determined density of 1.4 to the predetermined range of density values. For example, the determined density of the sub-set of patches is 1.4, and a comparison to the 1.4 value in the predetermined range of density values yields that print substance savings can be applied, according to Table 1.

The memory resource 310 may store instructions 346 which may be executed by the processing resource 308 to cause controller 306 to adjust a print substance output of the cartridge based on the comparison of the determined density of the sub-set of patches to the predetermined range of density values. For example, controller 306 can adjust a print substance output of the cartridge to apply print substance savings. Print substance savings may be applied to the cartridge to save resources and increase the amount of print job output from the cartridge.

Print substance output adjustments according to this disclosure may allow for determination of cartridge densities. For example, different cartridges may have different densities at different instances in their lifespan. For example, manufacturing differences of the cartridges, the charge characteristics of the print substance contained in the cartridges, the dimensional tolerances of the cartridges, and/or an amount of print substance within a cartridge may result in cartridges depositing the print substance included therein at differing densities based on the aforementioned factors. The cartridge density may be determined at different output calibrations to identify whether print substance savings may be applied to a cartridge to conserve resources and/or increase the lifespan of a cartridge.

Figure 4:
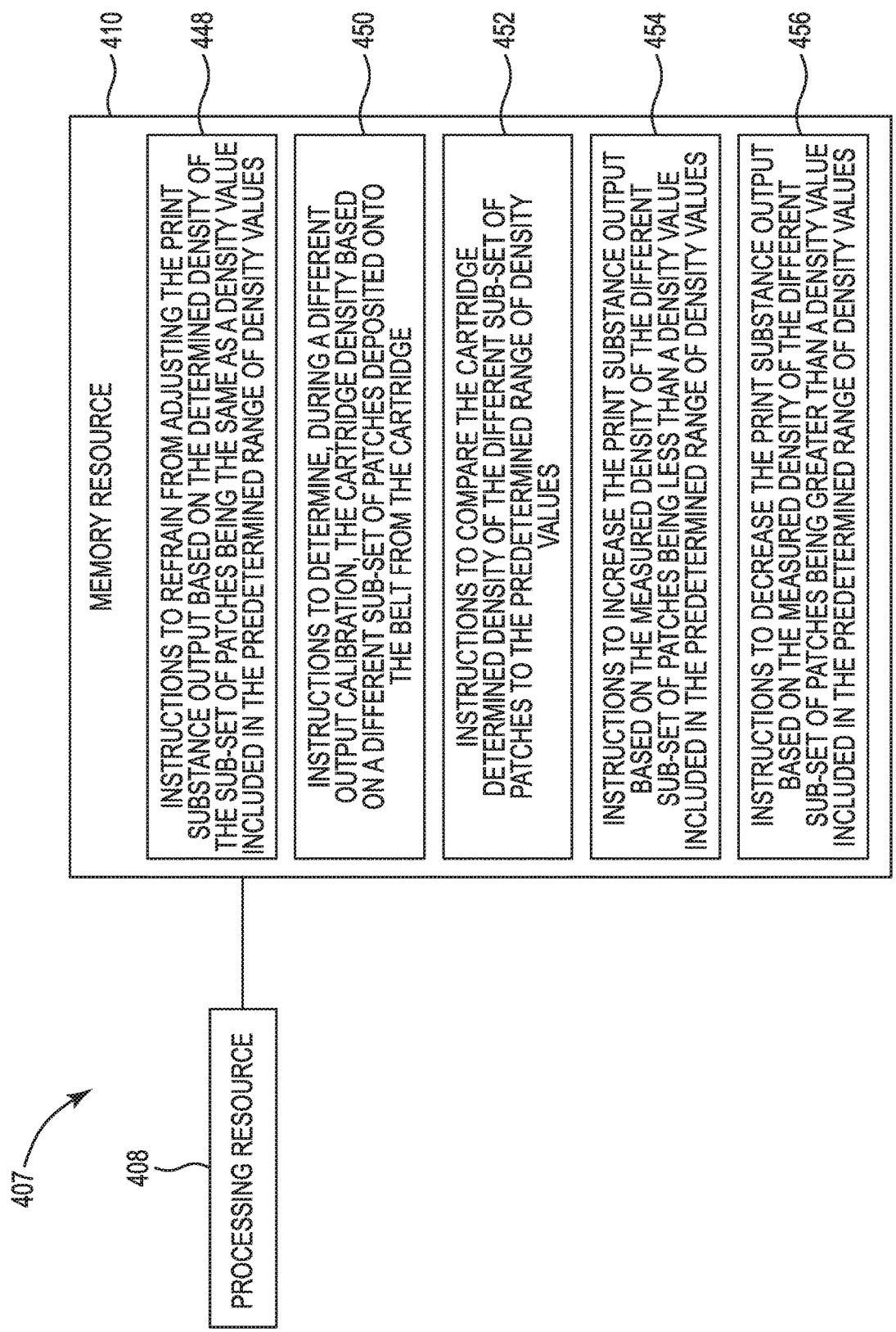
FIG. 4 illustrates an example system for print substance output adjustments consistent with the disclosure.

FIG. 4 illustrates an example system 407 for print substance output adjustments consistent with the disclosure. Although not shown in FIG. 4 for clarity and so as not to obscure examples of the disclosure, the system 407 may include a controller (e.g., the controller 106 of FIG. 1). For example, the controller may include a processing resource 408 for retrieval and execution of instructions stored in a memory resource (e.g., in a non-transitory computer readable medium) 410.

The memory resource 410 may store instructions thereon, such as instructions 448, 450, 452, 454, and 456. When executed by the processing resource 408, the instructions may cause the controller to perform specific tasks and/or functions. For example, the memory resource 410 may store instructions 448 which may be executed by the processing resource 408 to cause the controller to refrain from adjusting the print substance output based on the determined density of the sub-set of patches (e.g., the sub-set of patches 214 of FIG. 2) being the same as a density value included in the predetermined range of density values. For example, during an output calibration, if the determined cartridge density based on the sub-set of patches is 1.0, the controller may refrain from altering the print substance output (e.g., refraining from applying print substance savings) (e.g., based on the comparison of the density of the sub-set of patches to the predetermined range of density values). In this way, the printing device may avoid repeating print jobs by determining that print substance savings may not be successfully applied. In some examples, a different output calibration may take place at a different instance and produce a different cartridge density.

In an example in which a cartridge has reached the end of its lifespan, it may be discarded, and a new cartridge may be installed into the printing device. In such an example, a different output calibration may be initiated to identify if print substance savings may be applied to the new cartridge. For example, the memory resource 410 may store instructions 450 which may be executed by the processing resource 408 to determine, during a different output calibration, the cartridge density based on a different sub-set of patches deposited onto the belt (e.g., the belt 204) from the cartridge. In this example, the (new) cartridge may deposit the print substance contained therein on a different part of the belt (than was used by the discarded cartridge), and the sensor (not expressly illustrated by FIG. 4) may measure the density of the different sub-set of patches.

The memory resource 410 may store instructions 452 which may be executed by the processing resource 408 to compare the determined cartridge density of the different sub-set of patches to the predetermined range of density values. In this example, the controller may compare the determined density of the new cartridge to the predetermined range of density values that may be stored in the memory resource 410. Based on the comparison, the new cartridge may have print substance savings applied to it to conserve resources and extend the lifespan of the new cartridge.

In some examples, as the new cartridge ages, print substance savings that were previously applied when the cartridge was new may be removed so that the print media output is satisfactory. For example, the memory resource 410 may store instructions 454 which may be executed by the processing resource 408 to increase the print substance output based on the measured density of the different sub-set of patches being less than a density value included in the predetermined range of density values. In this example, the cartridge density has decreased to a level that print substance savings may be removed, thus increasing the print substance output deposited on print media. In this way, through repeated output calibration events, redundant print jobs may be avoided, thus resources may be conserved. In other examples, the different sub-set of patches may have a calculated density that is greater than a predetermined threshold, thus the print substance savings may be applied.

For example, the memory resource 410 may store instructions 456 which may be executed by the processing resource 408 to decrease the print substance output based on the measured density of the different sub-set of patches being greater than a density value included in the predetermined range of density values. In this example, the cartridge density has increased and/or stayed the same as a level that print substance saving may be applied, thus decreasing the print substance output deposited on print media.

Print substance output adjustments according to this disclosure may allow for determination of cartridge densities. For example, different cartridges may have different densities at different instances in their lifespan. For example, manufacturing differences of the cartridges, the charge characteristics of the print substance contained in the cartridges, the dimensional tolerances of the cartridges, and/or an amount of print substance within a cartridge may result in cartridges depositing the print substance included therein at differing densities based on the aforementioned factors. The cartridge density may be determined at different output calibrations to identify whether print substance savings may be applied to a cartridge to conserve resources and/or increase the lifespan of a cartridge.

Figure 5:
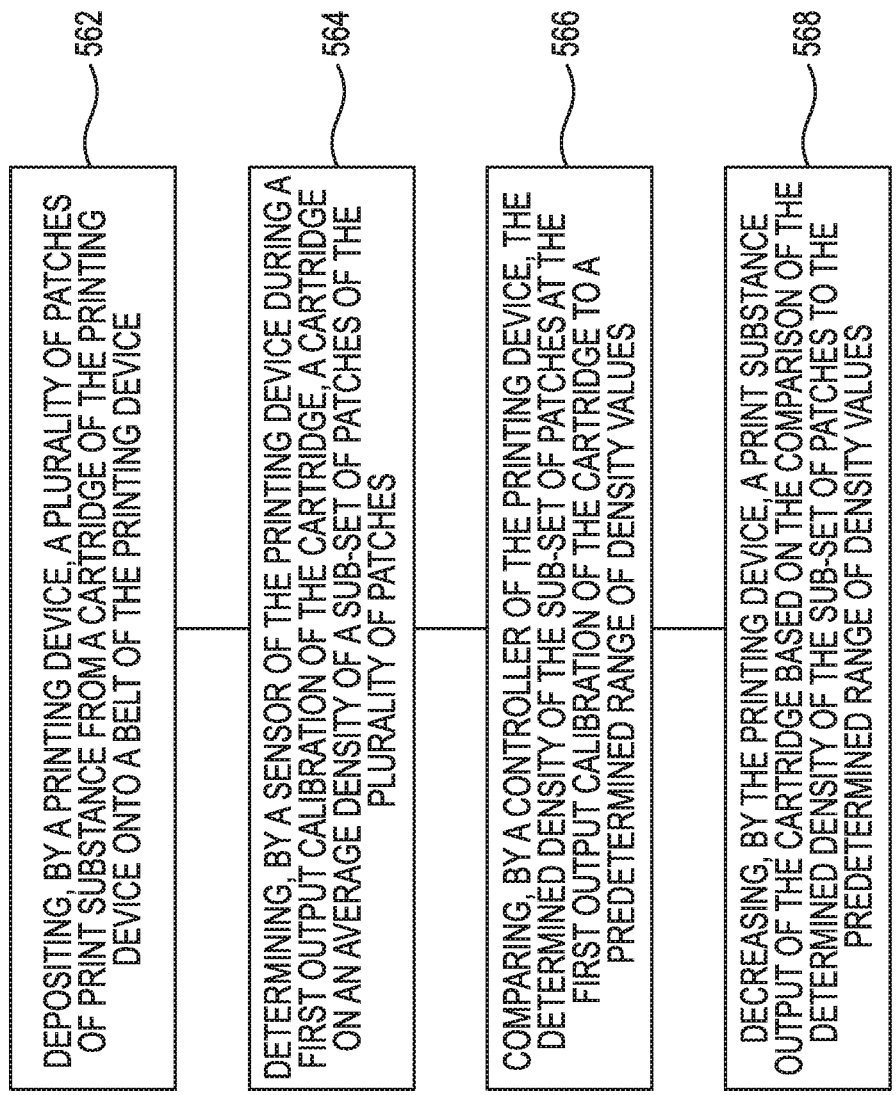
FIG. 5 illustrates an example method consistent with the disclosure.

FIG. 5 illustrates an example method consistent with the disclosure. At 562, the method may include depositing, by a printing device (e.g., the printing device 100 of FIG. 1), a plurality of patches (e.g., the plurality of patches 112 of FIG. 1) of print substance from a cartridge (e.g., the cartridge 102 of FIG. 1) of the printing device onto a belt (e.g., the belt 104 of FIG. 1) of the printing device. For example, the printing device may deposit the print substance contained within the cartridge to determine the cartridge density of the cartridge.

At 564, the method may include determining, by a sensor of the printing device during a first output calibration of the cartridge, a cartridge density based on an average density of a sub-set of patches (e.g., the sub-set of patches 214 of FIG. 2) of the plurality of patches. For example, the first output calibration may be when the cartridge is new, and the cartridge density may be determined to identify if print substance savings may be applied to the cartridge. To make this determination, the average density calculated for the sub-set of patches during he first calibration are compared to a predetermined range of density values (e.g., Table 1 and/or Table 2, as previously described in connection with FIG. 1) that may be stored by the controller.

At 566, the method may include comparing, the determined density of the sub-set of patches at the first output calibration of the cartridge to a predetermined range of density values. In this example, based on this comparison, the cartridge density may be determined to produce markings on print media that are dark enough to produce a satisfactory print job output.

At 568, the method may include decreasing a print substance output of the cartridge based on the comparison of the determined density of the sub-set of patches to the predetermined range of density values. In this example, the determined density of the sub-set of patches during the first output calibration may indicate that print substance savings may be applied to the cartridge, and therefore the cartridge density during the first calibration may produce marks dark enough that print substance output may be decreased to conserve resources, time, and money.

In some examples, a second calibration may determine that the cartridge density has not changed. For example, the controller may determine, during a second output calibration of the cartridge, the cartridge density based on a calculated average density of a different sub-set of patches of the plurality of patches deposited by the printing device during the second output calibration. In this example, the second output calibration results in a new sub-set of patches. The controller may further compare the determined density of the different sub-set of patches at the second output calibration of the cartridge to the predetermined range of density values.

The controller may compare the determined density from the different sub-set of patches to the predetermined range of density values to identify if the print savings that were applied after the first output calibration may remain in place or if it should be removed. For example, the controller may refrain from altering the print substance output of the cartridge based on a determination that the cartridge density determined at the first output calibration and the second output calibration is the same. In other words, the controller may determine that the second output calibration had the same result as the first output calibration, thus the print substance savings may remain the same to preserve resources.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature refers to more than one of such elements and/or features.

The above specification, examples and data provide a description of the method and applications and use of the system and method of the present disclosure. Since many examples can be made without departing from the spirit and scope of the system and method of the present disclosure, this specification merely sets forth some of the many possible example configurations and implementations.

What is claimed:

1. A printing device, comprising:
   a cartridge including a print substance;
   a belt; and
   a controller, comprising:
      a processing resource; and
      a memory resource including a non-transitory machine-readable instructions executable by the processing resource to:
         deposit a plurality of patches of the print substance from the cartridge onto the belt;
         determine a cartridge density based on a density of a sub-set of patches of the plurality of patches; and
         adjust a print substance output of the cartridge based on the determined cartridge density, wherein the instructions to adjust the print substance output of the cartridge comprise instructions to decrease the print substance output in response to the determined cartridge density being above a predetermined density threshold.

2. The printing device of claim 1, wherein the instructions to adjust the print substance output of the cartridge further comprise instructions to:
   refrain from adjusting the print substance output in response to the determined cartridge density being below a predetermined density threshold.

3. The printing device of claim 1, wherein the sub-set of patches of the plurality of patches are selected to determine the cartridge density based on the determined density of the sub-set of patches being above a predetermined density threshold.

4. The printing device of claim 1, wherein the instructions to determine the cartridge density further comprises instructions to calculate an average density of the sub-set of patches of the plurality of patches.

5. The printing device of claim 1, wherein the instructions to determine the cartridge density is performed at a predetermined interval based on an amount of print media output from the printing device.

6. A non-transitory machine-readable medium storing instructions that, when executed by a processing resource, cause the processing resource to:
   deposit a plurality of patches of print substance from a cartridge of a printing device onto a belt of the printing device;
   determine, during an output calibration of the cartridge, a cartridge density based on a sub-set of patches of the plurality of patches;
   compare the determined density of the sub-set of patches to a predetermined range of density values;
   determine whether the determined density of the sub-set of patches is less than a density value included in the predetermined range of density values; and
   in response to determining that the determined density of the different sub-set of patches is greater than the density value included in the predetermined range of density values, decrease the print substance output.

7. The medium of claim 6, further comprising instructions to:
   refrain from adjusting the print substance output based on the determined density of the sub-set of patches being the same as the density value included in the predetermined range of density values.

8. The medium of claim 6, storing instructions to:
   determine, during a different output calibration, the cartridge density based on a different sub-set of patches deposited onto the belt from the cartridge; and
   compare the determined cartridge density of the different sub-set of patches to the predetermined range of density values.

9. The medium of claim 8, storing instructions to:
   increase the print substance output based on the measured density of the different sub-set of patches being less than a density value included in the predetermined range of density values.

10. A method, comprising:
    depositing, by a printing device, a plurality of patches of print substance from a cartridge of the printing device onto a belt of the printing device;
    determining, by a sensor of the printing device during a first output calibration of the cartridge, a cartridge density based on an average density of a sub-set of patches of the plurality of patches;
    comparing, by a controller of the printing device, the determined density of the sub-set of patches at the first output calibration of the cartridge to a predetermined range of density values;
    decreasing, by the printing device, a print substance output of the cartridge based on the comparison of the determined density of the sub-set of patches to the predetermined range of density values; and
    determining, during a second output calibration of the cartridge, the cartridge density based on a calculated average density of a different sub-set of patches of the plurality of patches deposited by the printing device during the second output calibration, wherein the first and the second output calibrations occur at predetermined intervals that are based on an amount of print media output.

11. The method of claim 10, further comprising:
    comparing the determined density of the different sub-set of patches at the second output calibration of the cartridge to the predetermined range of density values.

12. The method of claim 11, further comprising:
    refraining from altering the print substance output of the cartridge based on a determination that the cartridge density determined at the first output calibration and the second output calibration is the same.

* * * * *